United States Patent
Zhou et al.

(10) Patent No.: US 11,863,319 B2
(45) Date of Patent: Jan. 2, 2024

(54) MULTICAST NETWORK CODING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,853

(22) Filed: Mar. 12, 2021

(65) Prior Publication Data

US 2021/0297988 A1    Sep. 23, 2021

Related U.S. Application Data

(60) Provisional application No. 62/992,678, filed on Mar. 20, 2020.

(51) Int. Cl.
*H04L 1/00* (2006.01)
*H04L 1/18* (2023.01)
*H04W 24/10* (2009.01)
*H04W 28/04* (2009.01)
*H04W 40/22* (2009.01)
(Continued)

(52) U.S. Cl.
CPC .......... *H04L 1/0076* (2013.01); *H04L 1/1812* (2013.01); *H04W 24/10* (2013.01);
(Continued)

(58) Field of Classification Search
CPC .... H04B 7/02–17; H04B 17/0082–409; H04L 1/0001–248; H04L 2001/0092–0098; H04L 5/0001–0098; H04W 4/30–48; H04W 8/22–245; H04W 24/02–10; H04W 28/02–26; H04W 36/0005–385; H04W 40/005–38; H04W 48/02–20; H04W 72/005–14;
(Continued)

(56) References Cited

U.S. PATENT DOCUMENTS

2010/0112957 A1    5/2010  Kong et al.
2010/0124186 A1 *  5/2010  Josiam ............... H04B 7/15521
(Continued)

FOREIGN PATENT DOCUMENTS

WO    WO-2015114077 A1 *  8/2015  ......... H04B 7/15521

OTHER PUBLICATIONS

International Search Report and Written Opinion—PCT/US2021/022379—ISA/EPO—dated Jul. 28, 2021.
(Continued)

*Primary Examiner* — Timothy J Weidner
(74) *Attorney, Agent, or Firm* — Shumaker & Sieffert, P.A.

(57) ABSTRACT

Certain aspects of the present disclosure provide techniques for efficiently transmitting data over multiple radio access technologies (RATs), for example, between a base station and a user equipment (UE). An example method by a receiver device generally includes receiving network coded packets from multiple transmitter devices, decoding the network coded packets, based on a network coding decoding scheme, to recover one or more source packets, generating feedback based on the decoding, and transmitting the feedback to the multiple transmitter devices.

27 Claims, 16 Drawing Sheets

(51) Int. Cl.
*H04W 72/00* (2023.01)
*H04W 84/02* (2009.01)
*H04W 88/06* (2009.01)
*H04W 88/10* (2009.01)
*H04W 92/02* (2009.01)
*H04W 92/10* (2009.01)
*H04W 92/18* (2009.01)
*H04W 92/20* (2009.01)
*H04L 1/1812* (2023.01)
*H04W 72/30* (2023.01)

(52) U.S. Cl.
CPC ........... *H04W 28/04* (2013.01); *H04W 40/22* (2013.01); *H04W 72/30* (2023.01); *H04W 84/02* (2013.01); *H04W 88/06* (2013.01); *H04W 88/10* (2013.01); *H04W 92/02* (2013.01); *H04W 92/10* (2013.01); *H04W 92/18* (2013.01); *H04W 92/20* (2013.01)

(58) Field of Classification Search
CPC ........... H04W 74/002–0891; H04W 76/10–50; H04W 84/005–22; H04W 88/005–188; H04W 92/02–24
See application file for complete search history.

(56) References Cited

U.S. PATENT DOCUMENTS

| | | |
|---|---|---|
| 2012/0117446 A1 | 5/2012 | Taghavi Nasrabadi et al. |
| 2014/0016469 A1* | 1/2014 | Ho ..................... H04L 1/0076 |
| 2014/0254460 A1* | 9/2014 | Lim ..................... H04L 1/0076 |
| 2018/0167162 A1 | 6/2018 | Whitwell |
| 2019/0097754 A1 | 3/2019 | Yu et al. |

OTHER PUBLICATIONS

Katti S, et al., "XORs in the Air: Practical Wireless Network Coding," IEEE/ACM Transactions on Networking, IEEE /ACM. New York, NY, US, vol. 16, No. 3, Jun. 1, 2008, pp. 497-510, XP058096387. ISSN: 1063-6692. DOI:10.1109/TNET.2008. 923722 section I. V-A. V-D figure 3.

Luiz, et al., "Multi-User Cooperative Diversity Through Network Coding Based on Classical Coding Theory", Feb. 15, 2011 (Feb. 15, 2011), XP055825253, 12 Pages, Retrieved from the Internet: URL: https://arxiv.org/pdf/1004.2757v2.pdf [Retrieved on Jul. 16, 2021] section V, figure 3.

Pang K., et al., "Distributed Network Coding for Wireless Sensor Networks Based on Rateless LT Codes", IEEE Wireless Communications Letters, IEEE, Piscataway, NJ, USA, vol. 1. No. 6, Dec. 1, 2012 (Dec. 1, 2012), pp. 561-564, XP011476139, ISSN: 2162-2337, DOI: 10.1109/WCL.2012.080112.120465, section II.

Partial International Search Report—PCT/US2021/022379—ISA/EPO—dated Jun. 15, 2021.

3GPP TS 36.322: "3rd Generation Partnership Project, Technical Specification Group Radio Access Network, Evolved Universal Terrestrial Radio Access (E-UTRA), Radio Link Control (RLC) Protocol Specification (Release 8)", V1.0.0 (Sep. 2007), pp. 1-19.

* cited by examiner

MULTICAST NETWORK CODING

PRIORITY CLAIM(S)

This application claims benefit of and priority to U.S. Provisional Application No. 62/992,678, filed on Mar. 20, 2020, which is expressly incorporated by reference in its entirety as if fully set forth below and for all applicable purposes.

FIELD OF THE DISCLOSURE

Aspects of the present disclosure relate to wireless communications, and more particularly, to techniques for utilizing network coding for efficient multicast transmission.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a receiver device. The method generally includes receiving network coded packets from multiple transmitter devices, decoding the network coded packets, based on a network coding decoding scheme, to recover one or more source packets, generating feedback based on the decoding, and transmitting the feedback to the multiple transmitter devices.

Certain aspects of the present disclosure are directed to an apparatus for wireless communication by a receiver device. The apparatus generally includes a receiver configured to receive network coded packets from multiple transmitter devices, at least one processor configured to decode the network coded packets, based on a network coding decoding scheme, to recover one or more source packets and generate feedback based on the decoding, and a transmitter configured to transmit the feedback to the multiple transmitter devices.

Certain aspects of the present disclosure are directed to an apparatus for wireless communication by a receiver device. The apparatus generally includes means for receiving network coded packets from multiple transmitter devices, means for decoding the network coded packets, based on a network coding decoding scheme, to recover one or more source packets, means for generating feedback based on the decoding, and means for transmitting the feedback to the multiple transmitter devices.

Certain aspects of the present disclosure are directed to a computer readable medium having instructions stored thereon for receiving network coded packets from multiple transmitter devices, decoding the network coded packets, based on a network coding decoding scheme, to recover one or more source packets, generating feedback based on the decoding, and transmitting the feedback to the multiple transmitter devices.

Certain aspects provide a method for wireless communication by a transmitter device. The method generally includes generating, from a radio link control (RLC) service data unit (SDU), a first number of source packets, generating, from the first number of source packets, a second number of network coded packets based on a network coding scheme, wherein the second number is greater than the first number, and transmitting the second number of network coded packets to a receiver device via one or multiple diverse paths.

Certain aspects of the present disclosure are directed to an apparatus for wireless communication by a transmitter device. The apparatus generally includes at least one processor configured to generate, from a RLC SDU, a first number of source packets and to generate, from the first number of source packets, a second number of network coded packets based on a network coding scheme, wherein the second number is greater than the first number, and a transmitter configured to transmit the second number of network coded packets to a receiver device via one or multiple diverse paths.

Certain aspects of the present disclosure are directed to an apparatus for wireless communication by a receiver device. The apparatus generally includes means for generating, from a RLC SDU, a first number of source packets, means for generating, from the first number of source packets, a second number of network coded packets based on a network coding scheme, wherein the second number is greater than the first number, and means for transmitting the second number of network coded packets to a receiver device via one or multiple diverse paths.

Certain aspects of the present disclosure are directed to a computer readable medium having instructions stored thereon for generating, from a RLC SDU, a first number of source packets, generating, from the first number of source packets, a second number of network coded packets based on a network coding scheme, wherein the second number is greater than the first number, and transmitting the second number of network coded packets to a receiver device via one or multiple diverse paths.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
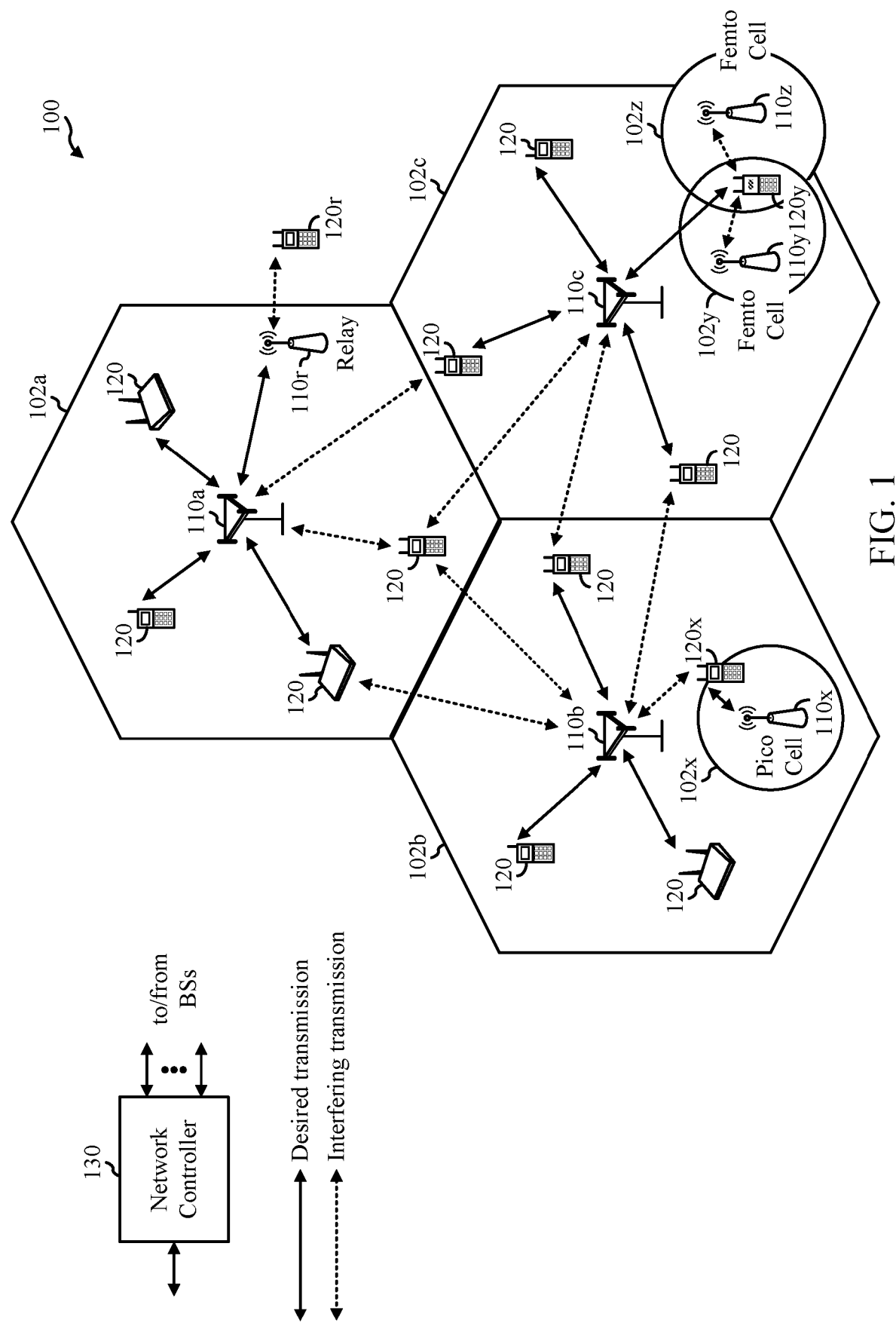
FIG. 1 is a block diagram conceptually illustrating an example telecommunications system, in accordance with certain aspects of the present disclosure.

Aspects of the present disclosure relate to wireless communications, and more particularly, to techniques for utilizing network coding for efficient multicast transmission using a radio link layer (RLC) network coding sublayer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and/or BS 110 of FIG. 1 may be configured to perform operations described below with reference to FIGS. 5 and 6 for efficient and reliable multicast transmission using a radio link layer (RLC) network coding sublayer.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
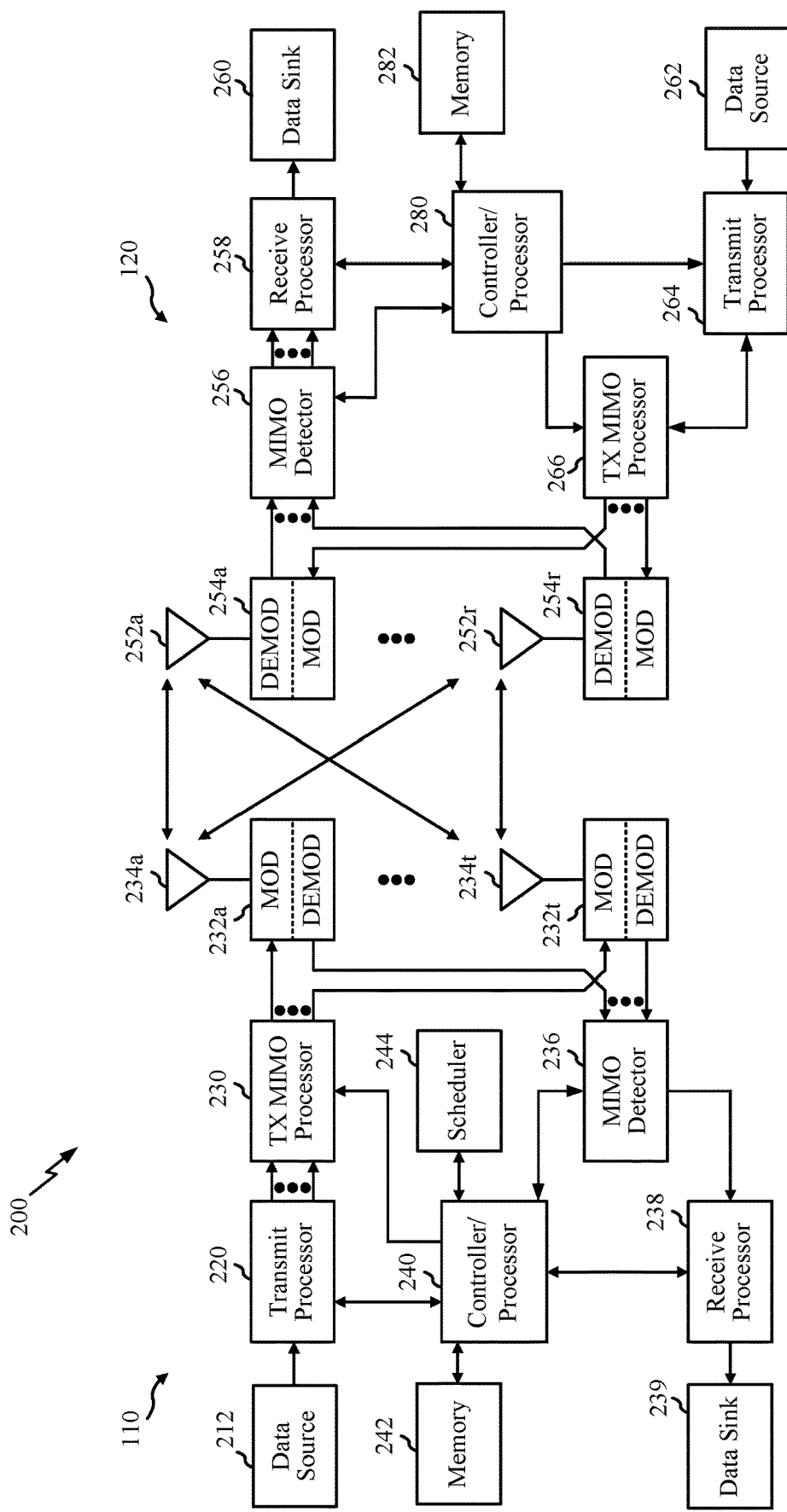
FIG. 2 is a block diagram conceptually illustrating a design of an example base station (BS) and user equipment (UE), in accordance with certain aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

Figure 5:
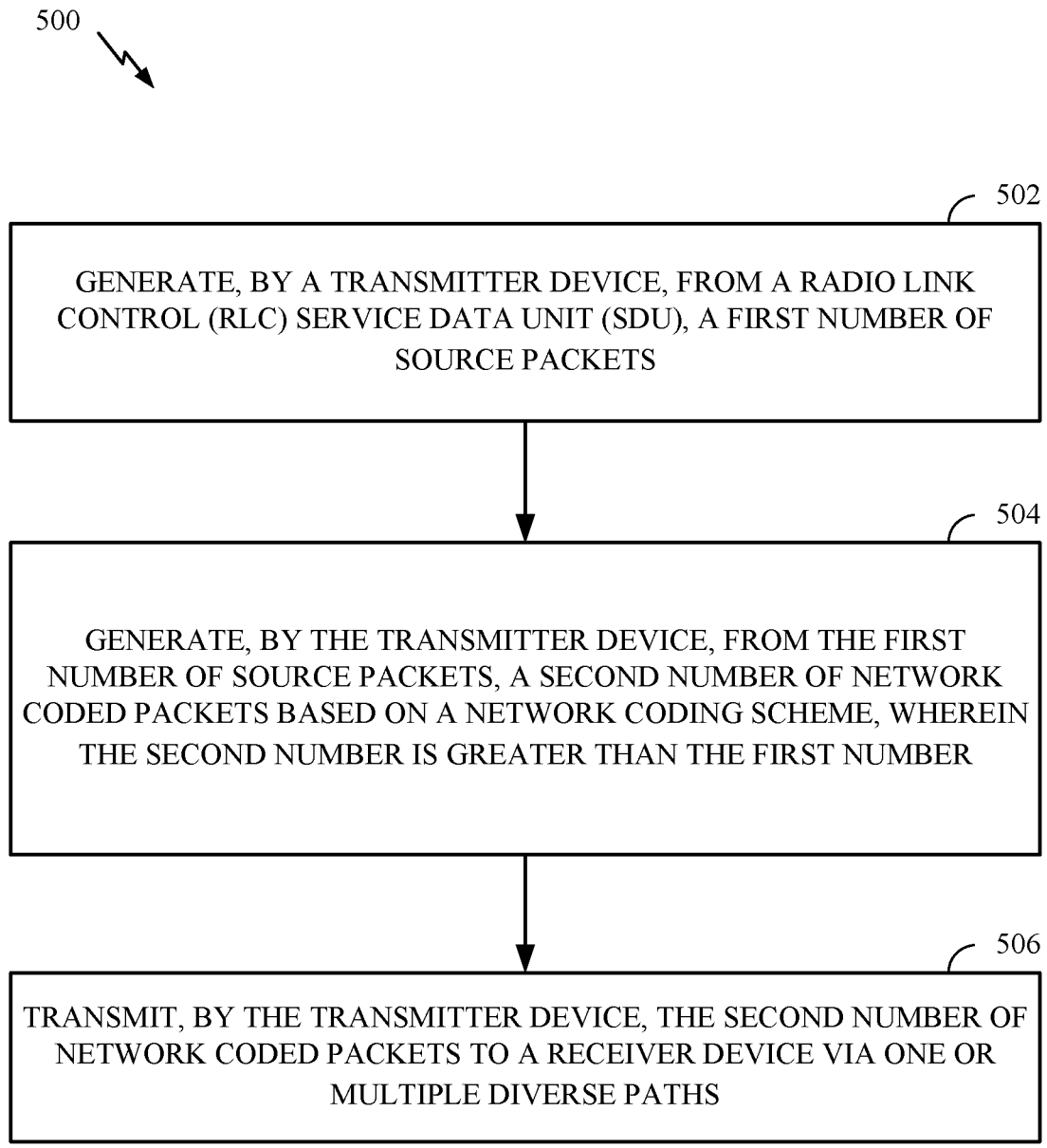
FIG. 5 illustrates example operations that may be performed by a transmitter device, in accordance with certain aspects of the present disclosure.
Figure 6:
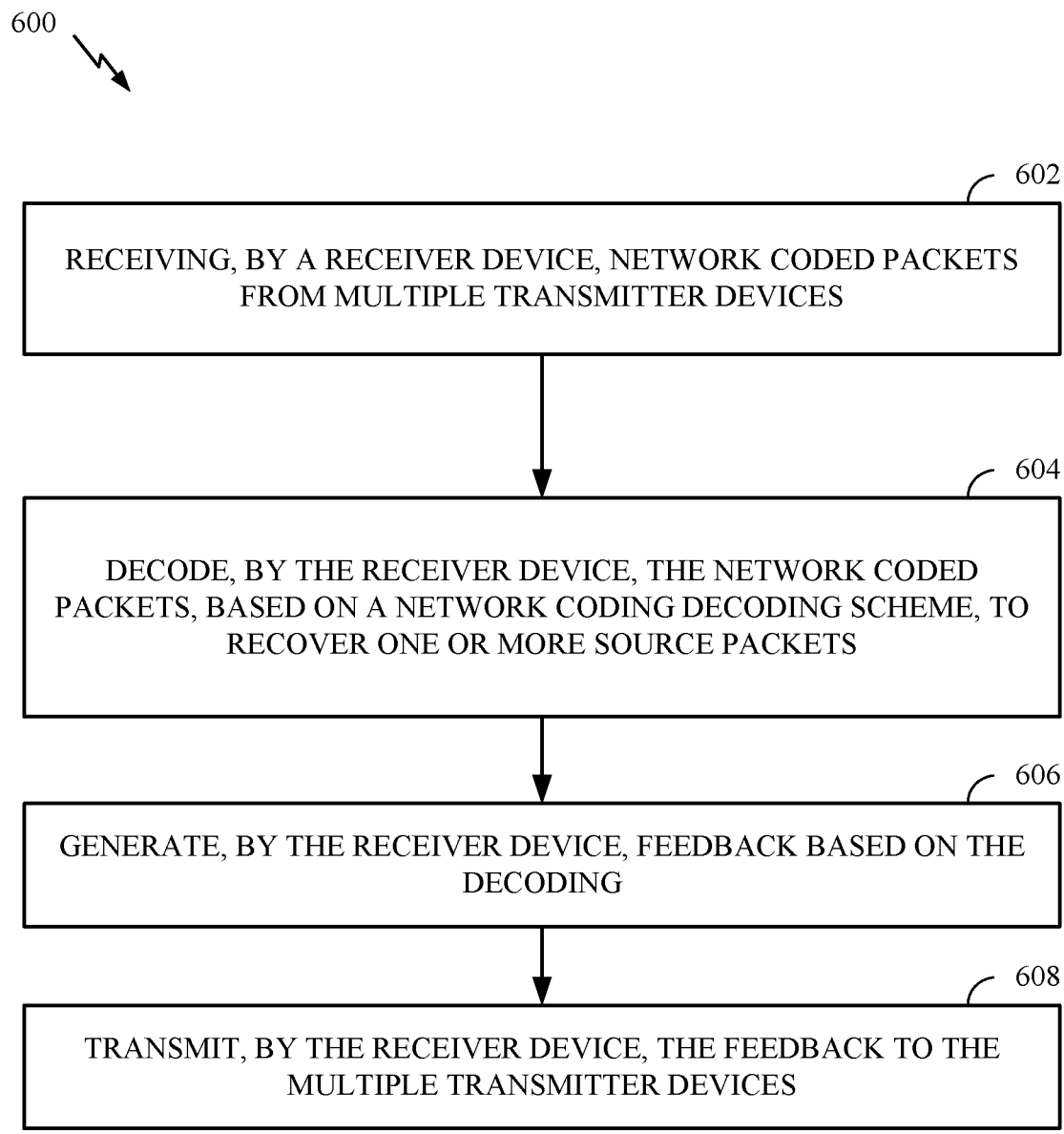
FIG. 6 illustrates example operations that may be performed by a receiver device, in accordance with certain aspects of the present disclosure.

The controller/processor 280 (and/or other processors and modules) at the UE 120 and/or the controller/processor 240 (and/or other processors and modules) of the BS 110 may direct perform or direct the execution of processes for the techniques described herein (e.g., with reference to FIGS. 5 and 6).

Example Multicast Network Coding Scheme for NR

Aspects of the present disclosure relate to wireless communications, and more particularly, to techniques for utilizing network coding for more efficient multicast transmission. As will be described in greater detail below, in some cases, a radio link layer (RLC) network coding sublayer may be used to increase efficiency and reliability while satisfying latency requirements.

Network coding generally refers to a technique where operations (e.g., algebraic algorithms), are performed on packets as they pass through nodes within a network. This is in contrast to traditional routing networks, where packets are simply cached and then forwarded to the next node downstream in the network. Network coding typically merges relevant messages at a node, using a given encoding, then forwards the accumulated result to a destination/receiver for decoding.

Figure 3A:
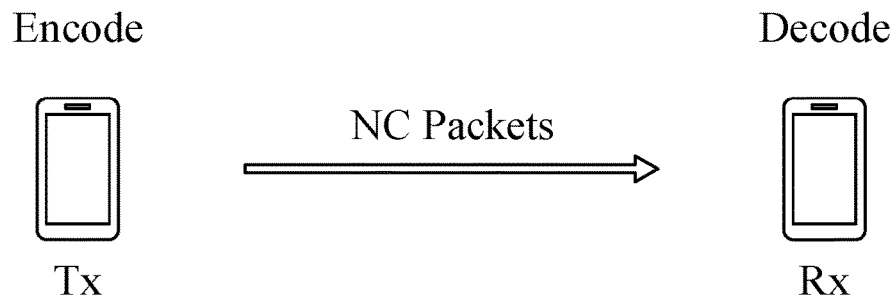
FIGS. 3A and 3B illustrate an example single hop network coding example.
Figure 3B:
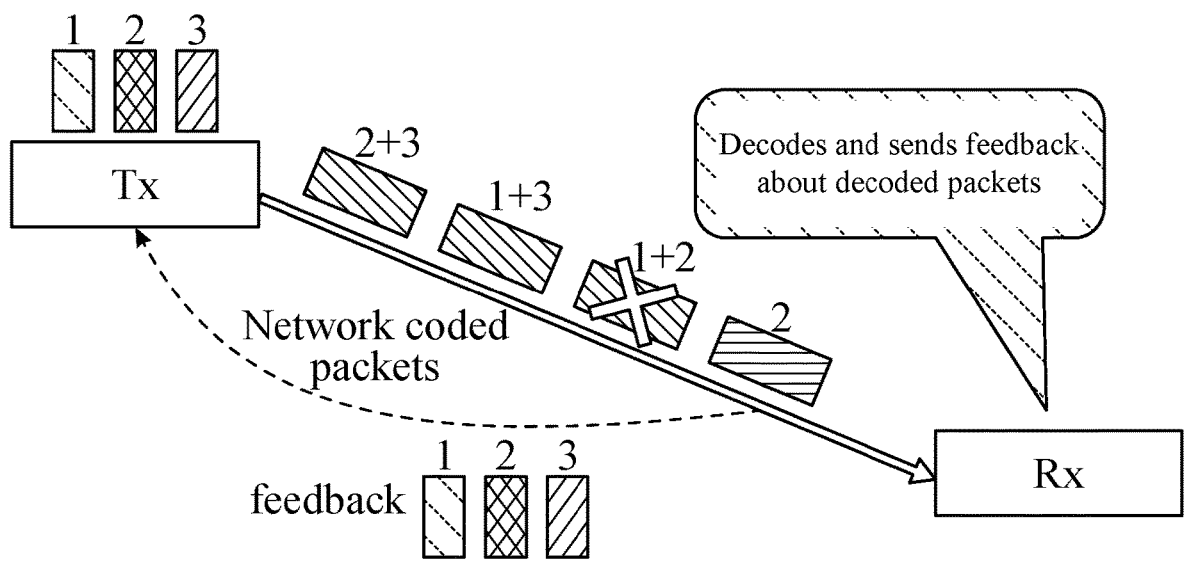

FIGS. 3A and 3B illustrate a simple single hop scenario utilizing NC. As shown in FIG. 3A, a transmitter device (Tx) generates and sends network coded packets to a receiver device (Rx). The transmitter device Tx (also referred to as a transmitter node, transmitter, encoder node, or encoder) and/or the receiver device Rx (also referred to as a receiver node, receiver, decoder node, or decoder) may be any type of UE, base station, an integrated access and backhaul (IAB) device, and/or the like.

As shown in FIG. 3B, the transmitter device Tx may generate the network coding packets from a set of original (or source) packets (e.g., packet 1 (p1), packet 2 (p2), and packet 3 (p3)). As illustrated, the network coding packets may be the same as a source packet or may include some combination of source packets (e.g., a linear combination of a subset of the source packets). Network coding may be performed using any type of network coding scheme, such as fountain coding, linear network coding, random linear network coding, Luby transform (LT) network coding, Raptor network coding, and/or the like.

The number of encoded packets is typically greater than the number of source packets, which provides redundancy and increases reliability. In the example illustrated in FIG. 3B, the transmitter device Tx encodes K original packets (e.g., K=3) into N network coded packets (e.g., N=4). As shown, the three source packets (p1, p2, and p3) are encoded into the four network coded packets: p2, p1+p2, p1+p3, and p2+p3.

The redundant information carried in the encoded packets may help the receiver device Rx recover the source packets even if not all of the network coded packets are successfully decoded. For example, assuming the receiver device Rx does not successfully decode network coded packet p1+p2 (as indicated by the X), the receiver device Rx may still be able to recover the source packets, as there is sufficient information in the other network coded packets (p2, p1+p3, and p2+p3). For example, the receiver device Rx may first decode network coded packet p2. Using the information for packet p2, the receiver may obtain packet p3 after decoding network coded packet p2+p3 (e.g., because the receiver has already decoded p2 and can use combining techniques to obtain p3 from p2+p3). In a similar manner, the receiver device Rx can obtain packet p1 from the network coded packet p1+p3 (because the receiver device Rx has already decoded packet p3 and can use combining to obtain packet p1 from network coded packet p1+p3).

As illustrated, in some cases, the receiver device Rx may provide feedback. In this example, the receiver device Rx indicates the three source packets (p1, p2, and p3) were successfully decoded. As will be described in greater detail below, such feedback may be used to update the network coded scheme.

Figure 4:
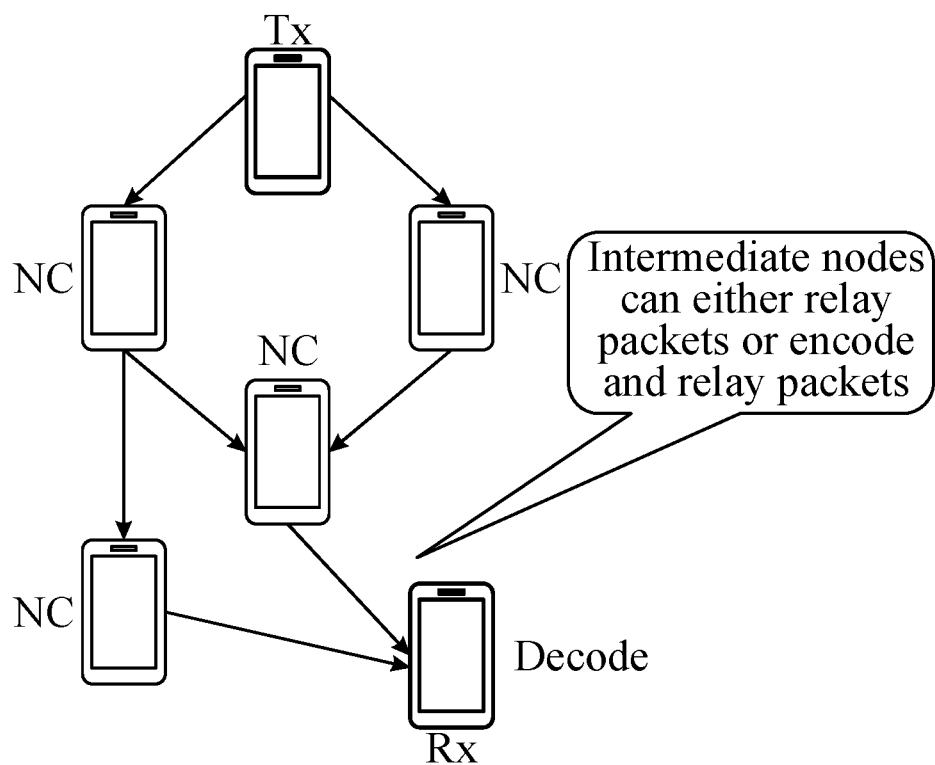
FIG. 4 illustrates an example multi-hop network coding example.

As shown in FIG. 4, the network coded coding scheme can be extended to a multi-hop deployment. In such cases, intermediate nodes (indicated by NC in FIG. 4) can either relay packets or encode and relay network coded packets.

Aspects of the present disclosure provide network coding schemes that may be applied to multicast transmission scenarios. As will be described in greater detail below, in some cases, a RLC network coding sublayer may be used to increase efficiency and reliability while still satisfying latency requirements.

FIG. 5 illustrates example operations 500 that may be performed by a transmitter device/UE, in accordance with certain aspects of the present disclosure. For example, operations 500 may be performed by one of the UEs or base stations of FIG. 1 or FIG. 2 to efficiently and reliably transmit data to a receiver device.

Operations 500 begin, at 502, by generating, from a RLC service data unit (SDU), a first number of source packets. At 504, the transmitter UE generates, from the first number of source packets, a second number of network coded packets using a network coding scheme, wherein the second number is greater than the first number. At 506, the transmitter transmits the second number of network coded packets to a receiver device via one or multiple diverse paths.

FIG. 6 illustrates example operations 600 that may be performed by a receiver device, in accordance with certain aspects of the present disclosure, and may be considered complementary to operations 500 of FIG. 5. For example, operations 600 may be performed by one of the UEs or base stations of FIG. 1 or FIG. 2 to process network coded packets from a transmitter performing operations 500 of FIG. 5.

Operations 600 begin, at 602, by receiving network coded packets from multiple transmitter devices. At 604, the receiver device decodes the network coded packets, based on a network coding decoding scheme, to recover one or more source packets. At 606, the receiver device generates feedback based on the decoding. At 608, the receiver device transmitting the feedback to the multiple transmitter devices.

Figure 7:
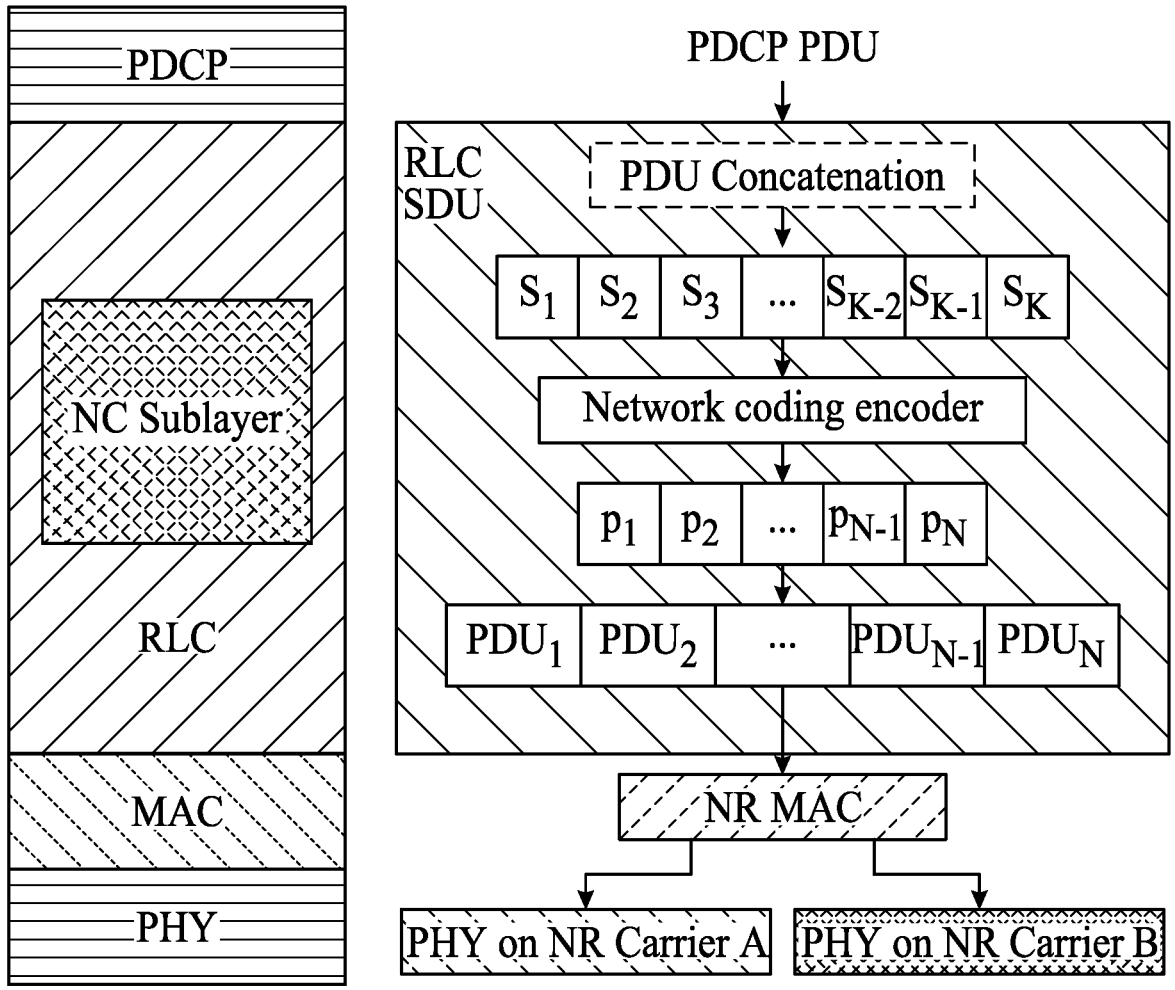
FIG. 7 is a diagram illustrating an example radio link control (RLC) network coding sublayer, in accordance with certain aspects of the present disclosure.

FIG. 7 is a diagram illustrating an example RLC network coding sublayer, in accordance with certain aspects of the present disclosure. As illustrated, a PDCP PDU may be concatenated (although this step may not be necessary when PDCP PDU size is relatively large) and divided into K RLC service data units (SDUs) (e.g., $S_1$-$S_K$). The size of SDUs may be predefined and, in some cases, the value of K may be optimized using the SDU size and a generator matrix. In some cases, the value of K may be optimized based on one or more of the following parameters: targeted error rate, channel condition, network coding functions, device computation resources, and delay budget.

Next, network coding (e.g., encoding) may be performed to generate N packets (e.g., $p_1$-$p_N$), which may be mapped to N PDUs ($PDU_1$-$PDU_N$). The value of N may be determined, for example, by the particular network coding function, targeted error probability, and/or channel conditions. The N PDUs may then be passed to the MAC layer, to be distributed to physical (PHY) layers for transmission over multiple links (e.g., different component carriers and/or different RATs). At the receiver-side, the network coding sublayer may process the network coded packets, performing network decoding operations corresponding to the encoding operations described above, and generating feedback to the transmitter (or multiple transmitters).

In a multicast scenario with multiple transmitters, each participating transmitter may have a network coding sublayer, as shown in FIG. 7, and may use the same network coding scheme. Depending on the scenario, however, each transmitter may send the same source packets or each transmitter may send their own (e.g., different) source packets.

Figure 8A:
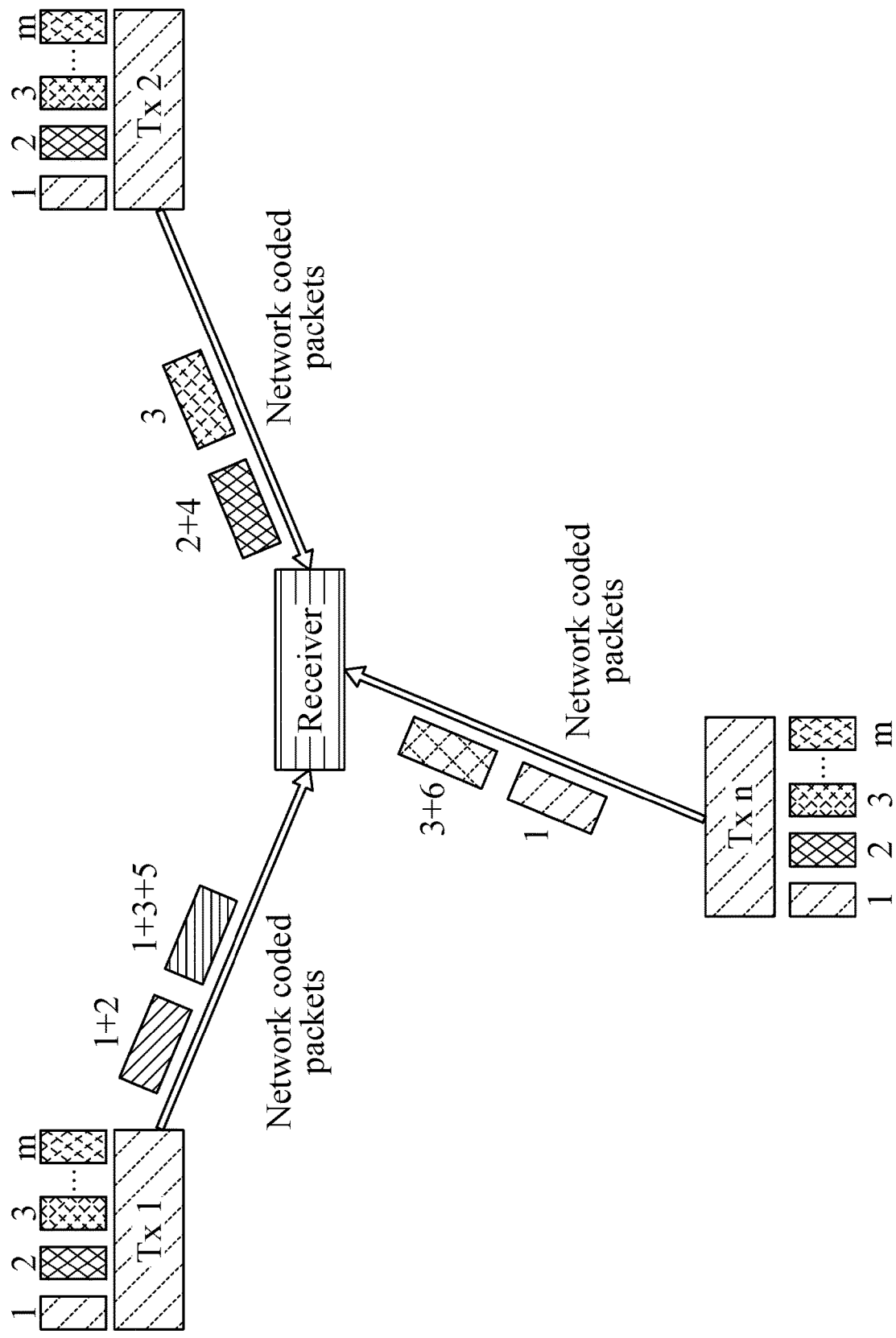
FIGS. 8A & 8B illustrate a first scenario for multicast network coding, in accordance with certain aspects of the present disclosure.
Figure 8B:
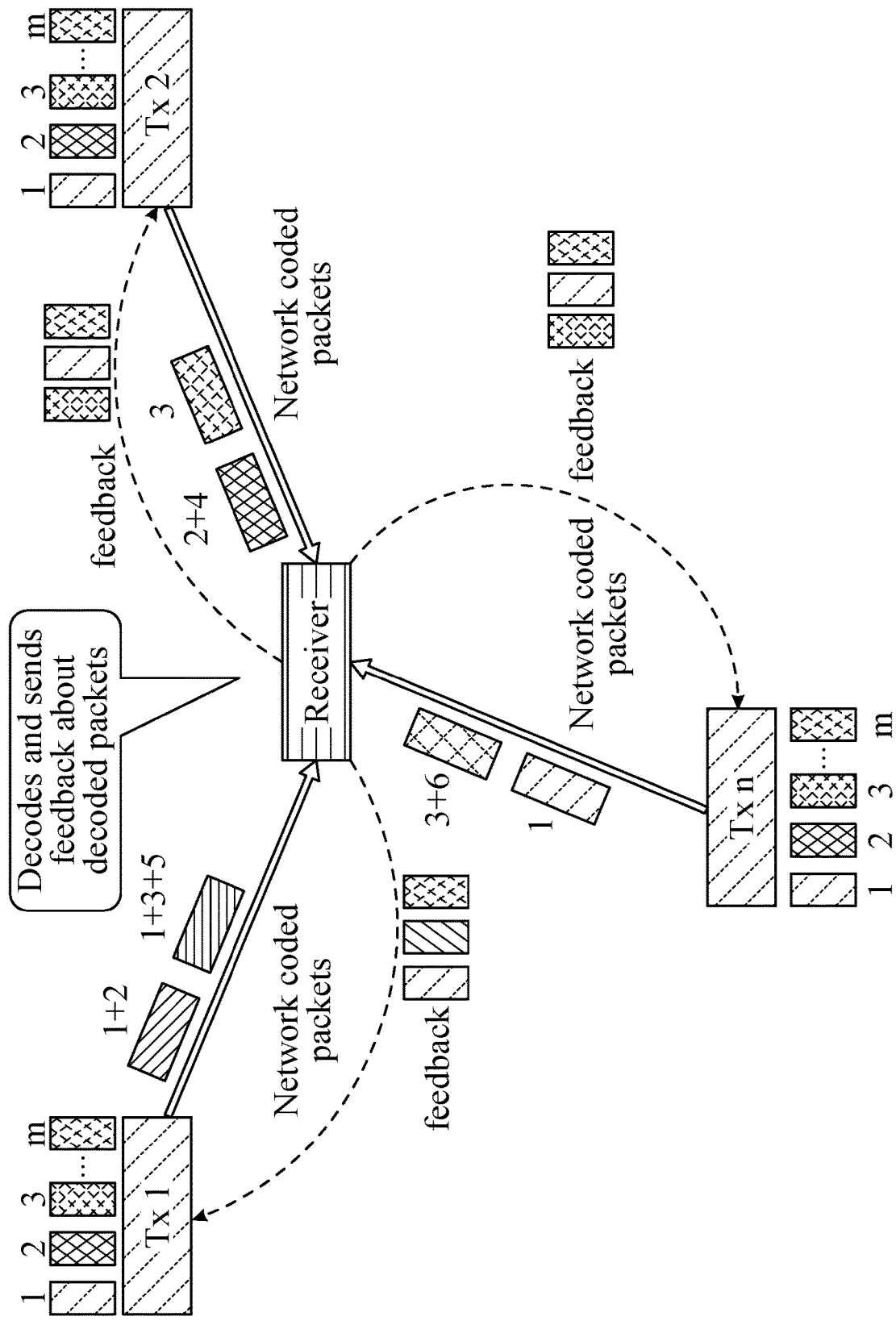

FIGS. 8A & 8B illustrate a first scenario for multicast network coding, in which multiple transmitters (Tx 1, Tx 2, and Tx n) have the same source packets to send (packets 1-m). Thus, in this scenario, the receiver intends to receive one set of the original (source) packets.

As illustrated in FIG. 8A, due to the general randomness of the network coding scheme, however, each transmitter Tx 1, Tx 2, and Tx n generates different network coded packets. This application scenario may be used, for example, in a multiple transmitter receiver point (multi-TRP) scenario where each link corresponds to a beam, a dual connectivity (DC) scenario where each link is associated with one gNB, and/or a carrier aggregation (CA) scenario where each link is one carrier.

As illustrated in FIG. 8B, the receiver decodes the data and sends the same feedback information to all transmitters Tx 1, Tx 2, and Tx n (e.g., indicating which of the packets was successfully received). Each transmitter Tx 1, Tx 2, and Tx n then updates the network coding scheme (e.g., via a encoding distribution function), according to the decoded packets report from receiver. In some cases, the feedback may be provided via a network coding sub layer decoded packets report.

Figure 9:
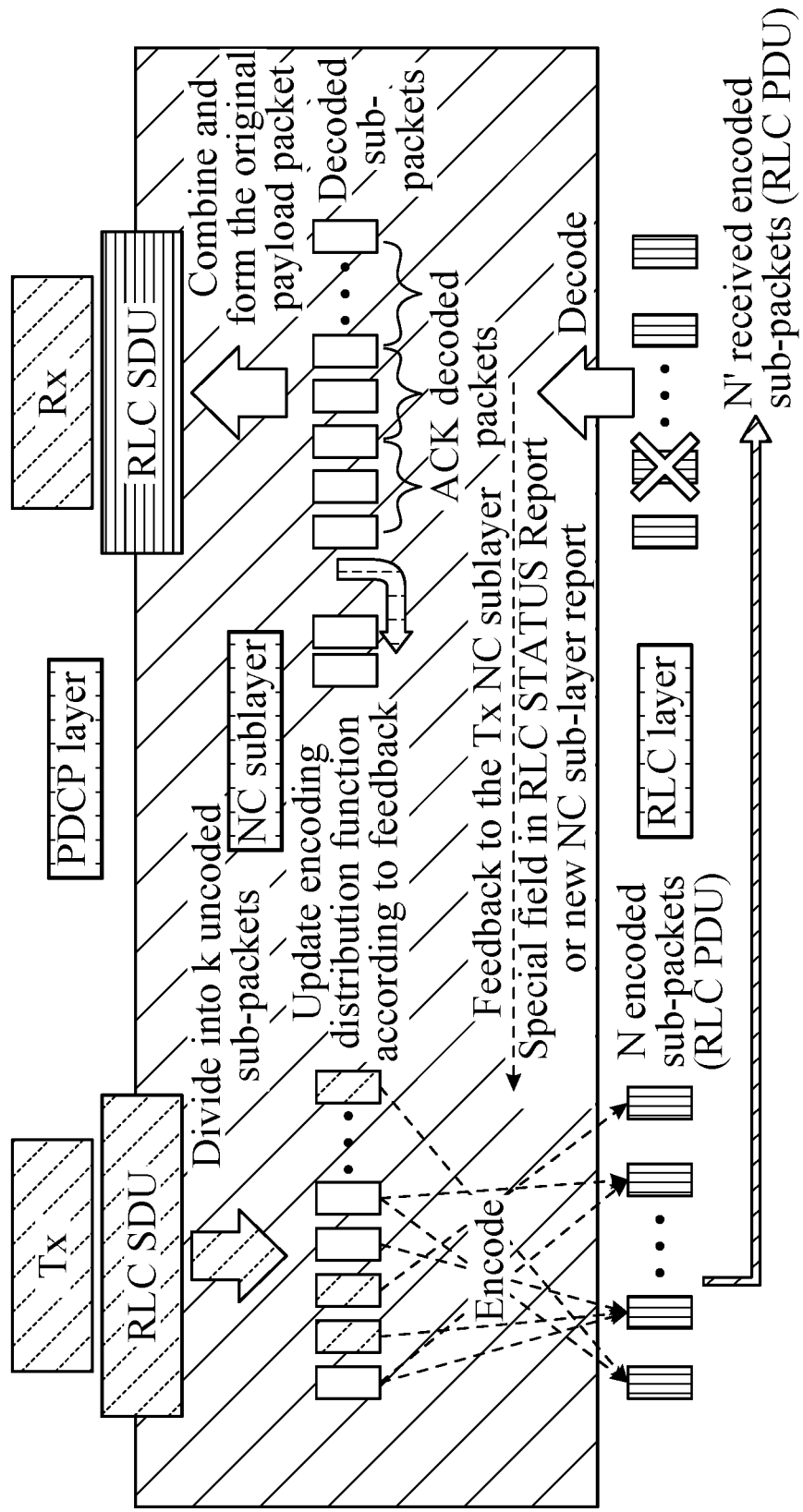
FIG. 9 illustrates how a network coding scheme may be updated based on feedback in the first scenario, in accordance with aspects of the present disclosure.

FIG. 9 illustrates, in greater detail, how a network coding scheme may be updated based on feedback received via an NC sub layer decoded packets report. As illustrated, the receiver Rx generates acknowledgment information (ACK) for decoded packets and provides this as feedback to the transmitter Tx NC sublayer. In the illustrated example, the receiver Rx failed to decode one of the packets (as indicated by the X). The feedback may be provided via a special (new) field in an RLC status Report or could be a (newly defined) NC sub-layer report.

As illustrated, upon receiving the feedback, the transmitter Tx NC sublayer may update the NC scheme, for example, adjusting encoding distribution function according to feedback. For example, assuming the transmitter Tx wants to send packets p1, p2, p3, p4 to the receiver Rx, the transmitter Tx may first generate encoded (e.g., network coded) packets (pc1, pc2 . . . ) using an encoding function $f$, such that:

$$pc\_i = f(p1, p2, p3, p4), \text{ for } i=1,2,3,4,\ldots,N$$

where pc_i is the ith encoded packet. Based on feedback from the receiver Rx, the transmitter Tx may realize that the receiver Rx has already successfully decoded source packets p1 and p3. Thus, the transmitter Tx can update its encoding function from $f$ to F, and send encoded packets:

$$pc\_i' = F(p2, p4), \text{ for } i'=1,2,3,4 \ldots,$$

where pc_i' is the ith encoded packet after receiving the feedback information. In this example, the updated encoded function F does not take (positively) acknowledged (ACKed) packets (p1, p3) into account when encoding. As another example, again assuming source packets p1, p2, p3, and p4, the transmitter Tx could update its encoding function to F', and send encoded packets:

$$pc\_1 = F'(p1, p3, p4) = p1 + p3 + p4, \text{ and}$$

$$pc\_2 = F'(p1, p2, p3) = p1 + p2 + p3,$$

so that the receiver Rx and further decode p4 and p2, respectively. In this example, the updated encoded function does take ACKed packets (p1, p3) into account when encoding.

Figure 10A:
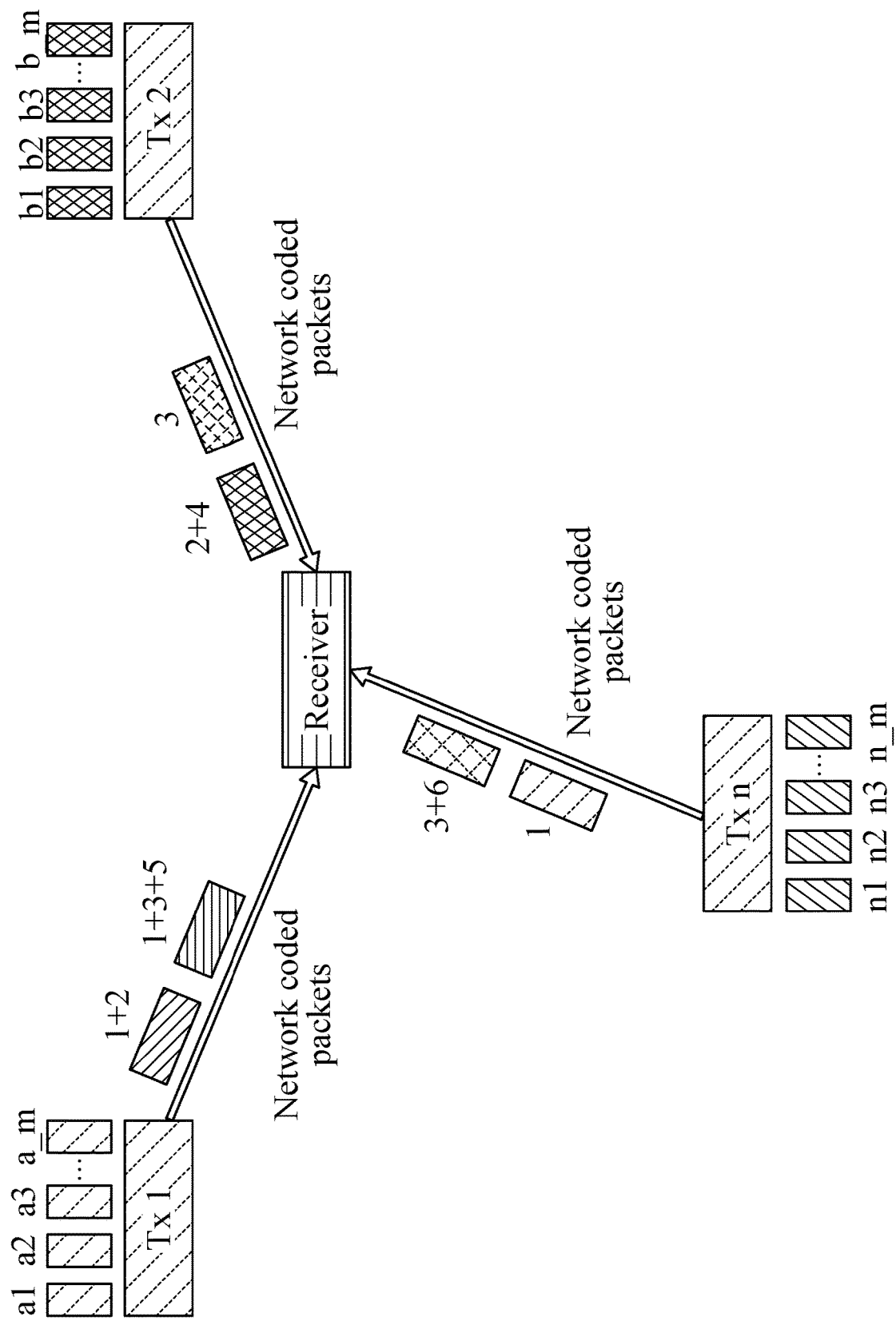
FIGS. 10A & 10B illustrate a second scenario for multicast network coding, in accordance with certain aspects of the present disclosure.
Figure 10B:
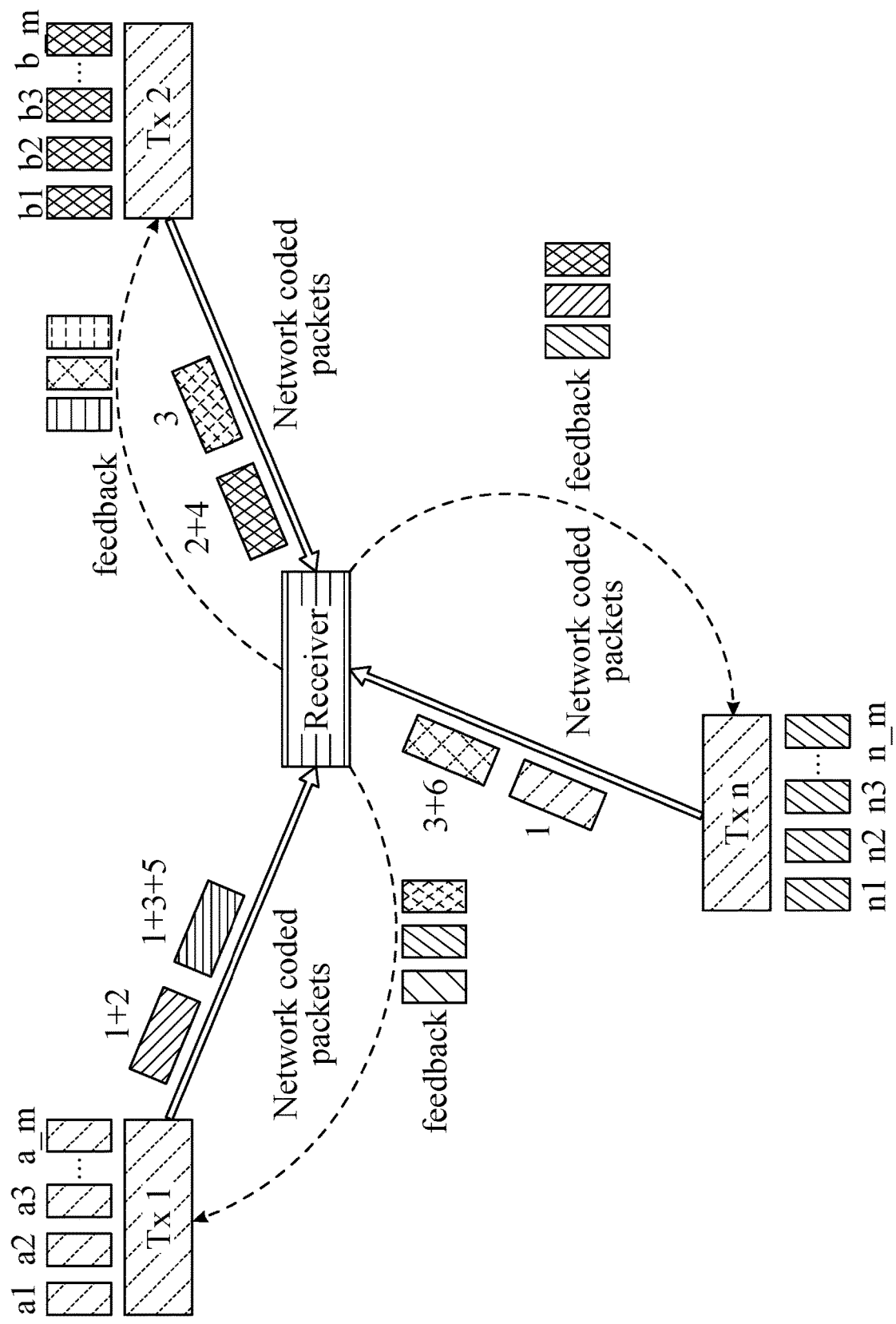

FIGS. 10A & 10B illustrate a second scenario for multicast network coding, in which multiple transmitters (Tx 1, Tx 2, and Tx n) have different source packets to send. As illustrated in FIG. 10A, Tx 1 sends packets a1-am, Tx 3 sends b1-bm, and Tx n sends n1-nm. Thus, in this scenario, the receiver, in effect, acts as three separate sub-receivers, to receive the different sets of the original (source) packets. This application scenario may also be used, for example, in multi-TRP, DC, and/or CA scenarios as explained above.

As illustrated in FIG. 10B, the receiver intends to receive a different set of original packets from each of the transmitters. Each transmitter generates different encoded packets using the same network coding scheme, but from different source packets. Thus, in this case, the receiver sends unique feedback information for each corresponding transmitter. Each transmitter then updates the NC scheme according to the feedback information. In this scenario, the feedback may be sent as a NC sub-layer report, an RLC status report, or via hybrid automatic repeat request (HARQ) ACK/NACK feedback.

Figure 11:
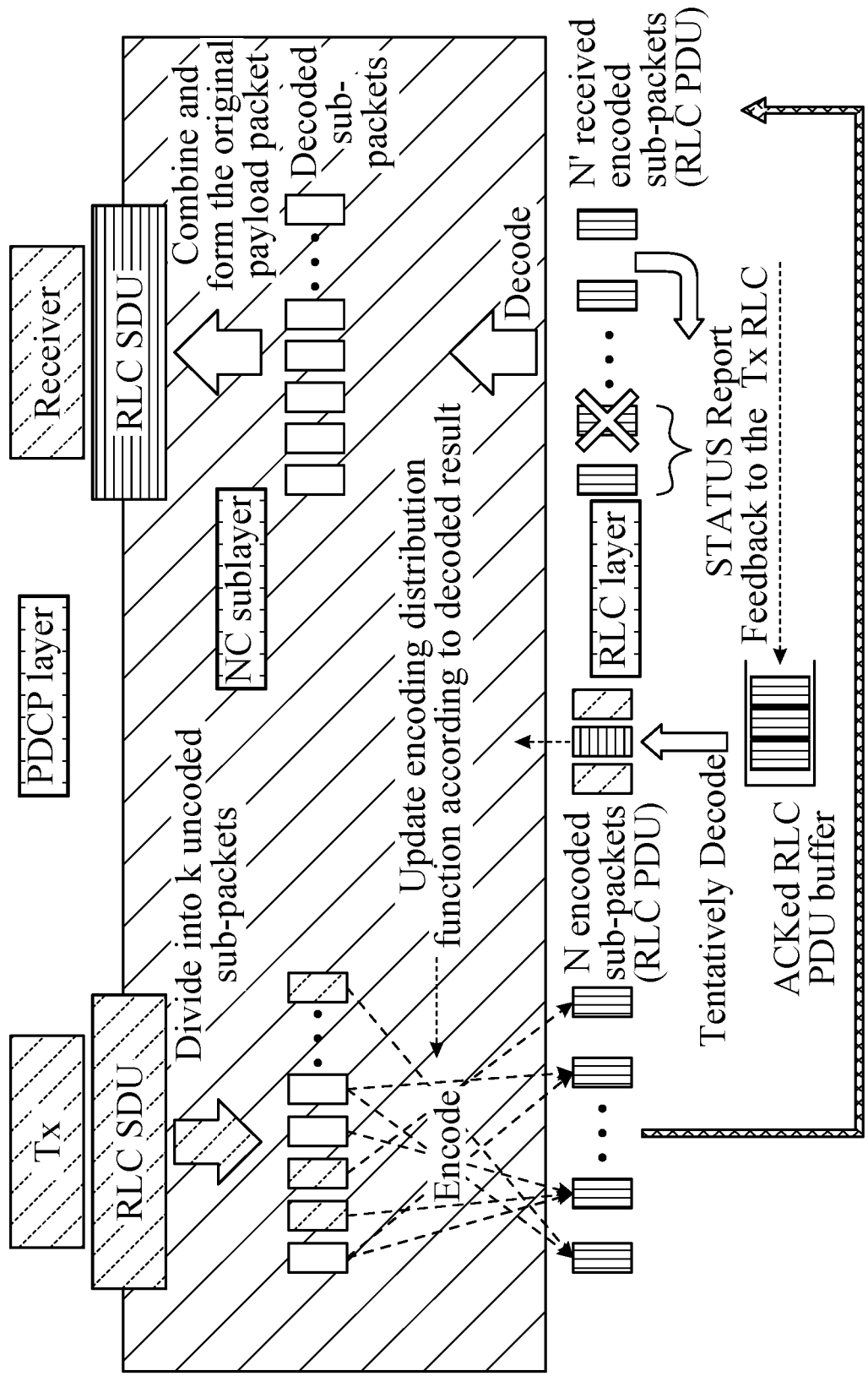
FIG. 11 illustrates one option for how a network coding scheme may be updated based on feedback in the second scenario, in accordance with aspects of the present disclosure.

FIG. 11 illustrates, in greater detail, how a NC scheme may be updated based on feedback received via an RLC status report. As illustrated, the receiver generates the status report with ACK information for decoded packets as feedback to the transmitter Tx NC sublayer. As illustrated, the transmitter Tx may maintain a buffer of the (RLC PDU) packets that were successfully received. The transmitter Tx may then try to tentatively decode the packets from this buffer, to recover the source packets, effectively doing the same work as the receiver. If the transmitter Tx is able to recover a source packet, it may assume the receiver can also able to decode the source packet and may update the encoder function accordingly.

Figure 12:
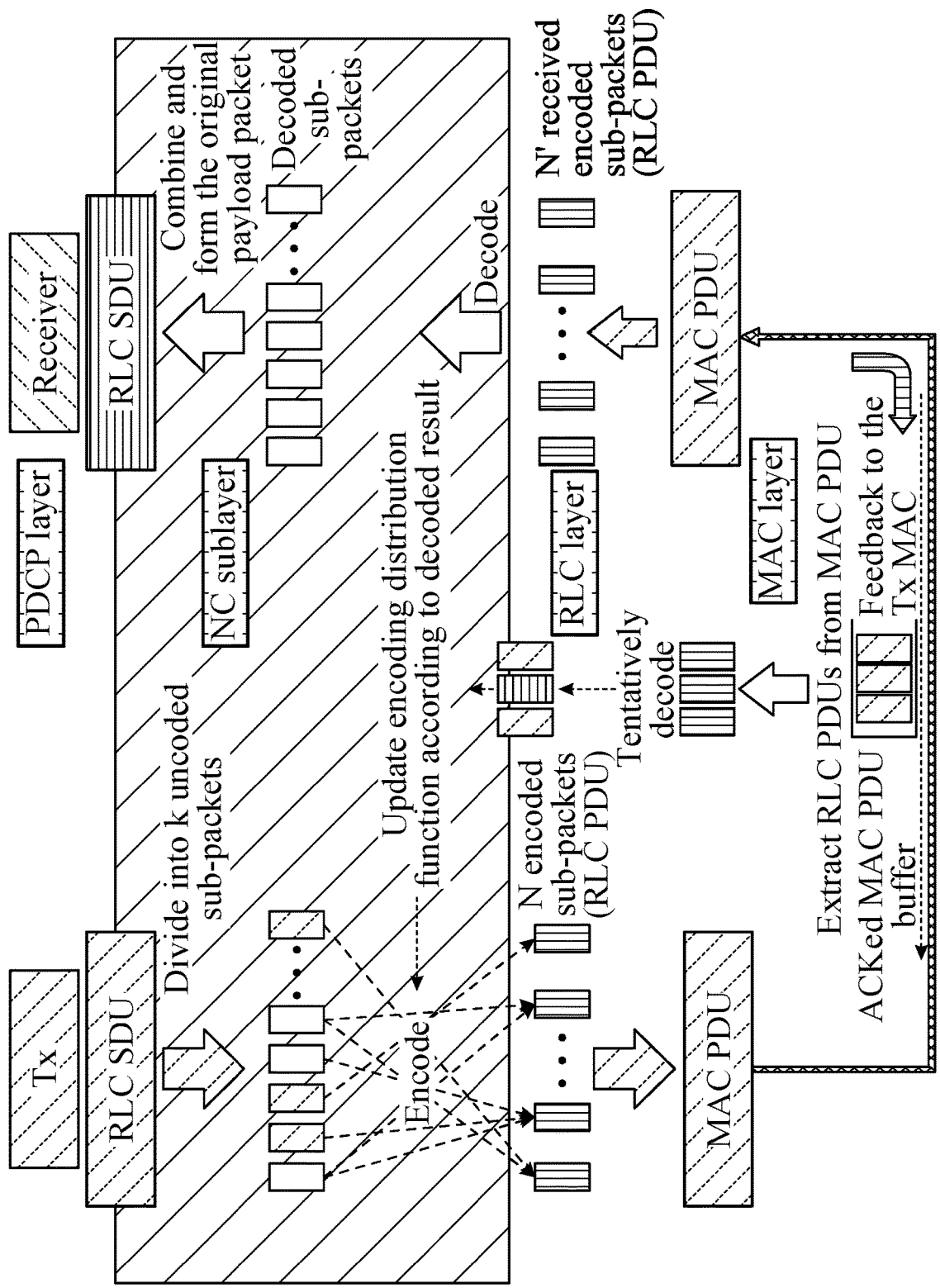
FIG. 12 illustrates another option for how a network coding scheme may be updated based on feedback in the second scenario, in accordance with aspects of the present disclosure.

FIG. 12 illustrates, in greater detail, how a network coding scheme may be updated based on feedback received via HARQ ACK/NACK feedback. As illustrated, the receiver generates the ACK/NACK feedback (one layer lower than for the RLC status report example above) for decoded packets as feedback to the transmitter Tx NC sublayer. Because the N encoded packets are transmitted as one or more MAC PDUs, the receiver side extracts MAC PDUs to decode the original packets. As illustrated, based on this feedback, the transmitter will maintain a buffer with MAC PDUs that were successfully decoded at the receiver (e.g., as indicated by the ACK feedback).

The transmitter will then extract the RLC PDUs and, in a similar manner as described above with reference to FIG. 11, tentatively decode these packets to recover the source packets, effectively doing the same work as the receiver. Again, if the transmitter Tx is able to recover a source packet, the transmitter Tx may assume that the receiver can also decode the source packet and may update the encoder function accordingly.

One advantage of the feedback approaches shown in FIGS. 11 and 12 is that they may be implemented without a change to a standard specification (e.g., the implementation may just be on the transmitter and receiver side).

Figure 13:
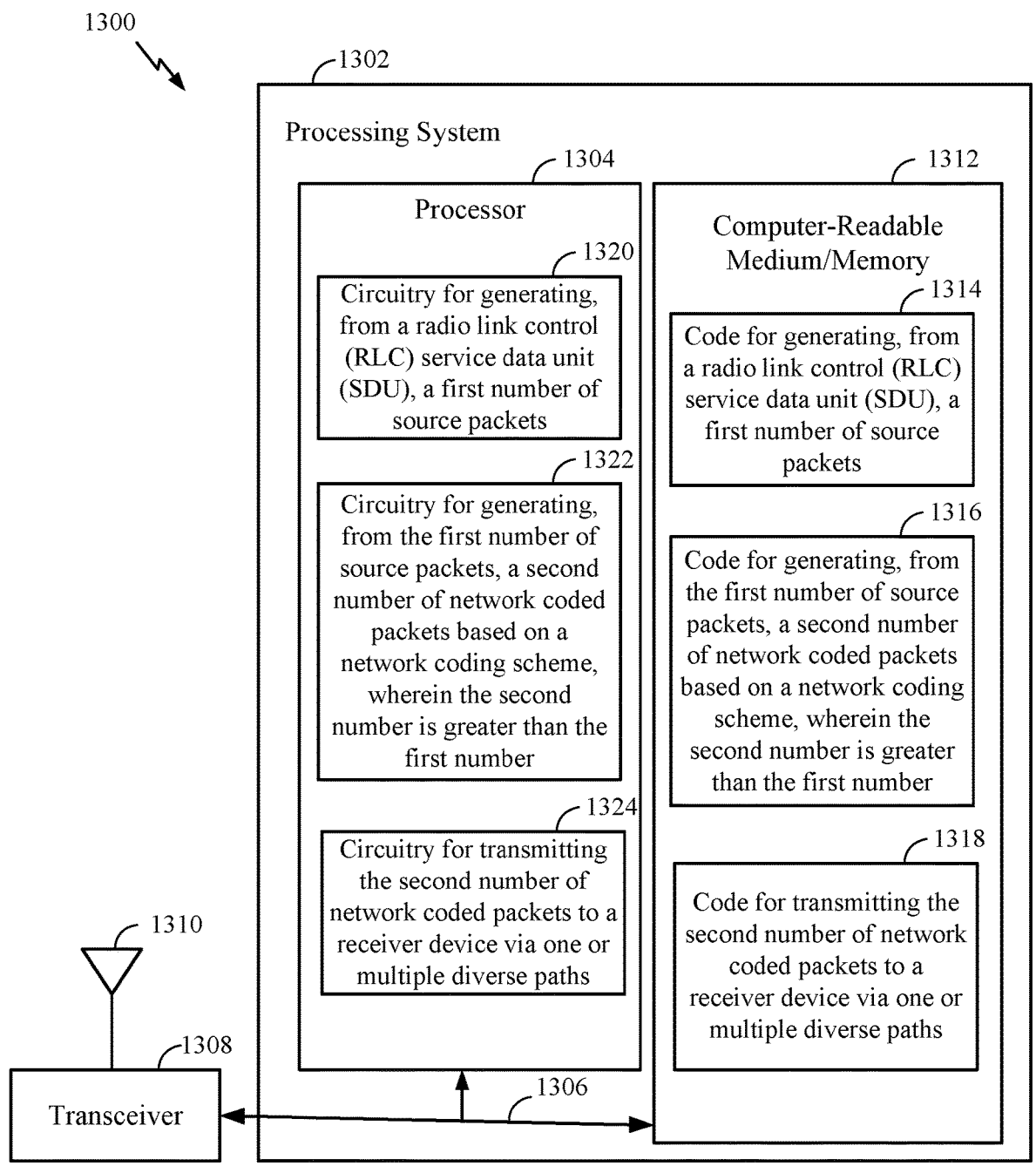
FIGS. 13-14 illustrate example communications devices that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 5, or other operations for performing the various techniques discussed herein. In certain aspects, computer-readable medium/memory 1312 stores code 1314 for generating, from a radio link control (RLC) service data unit (SDU), a first number of source packets; code 1316 for generating, from the first number of source packets, a second number of network coded packets based on a network coding scheme, wherein the second number is greater than the first number; and code 1318 for transmitting the second number of network coded packets to a receiver device via one or multiple diverse paths. In certain aspects, the processor 1304 has circuitry configured to implement the code stored in the computer-readable medium/memory 1312. The processor 1304 includes circuitry 1320 for generating, from a RLC SDU, a first number of source packets; circuitry 1322 for generating, from the first number of source packets, a second number of network coded packets based on a network coding scheme, wherein the second number is greater than the first number; and circuitry 1324 for transmitting the second number of network coded packets to a receiver device via one or multiple diverse paths.

Figure 14:
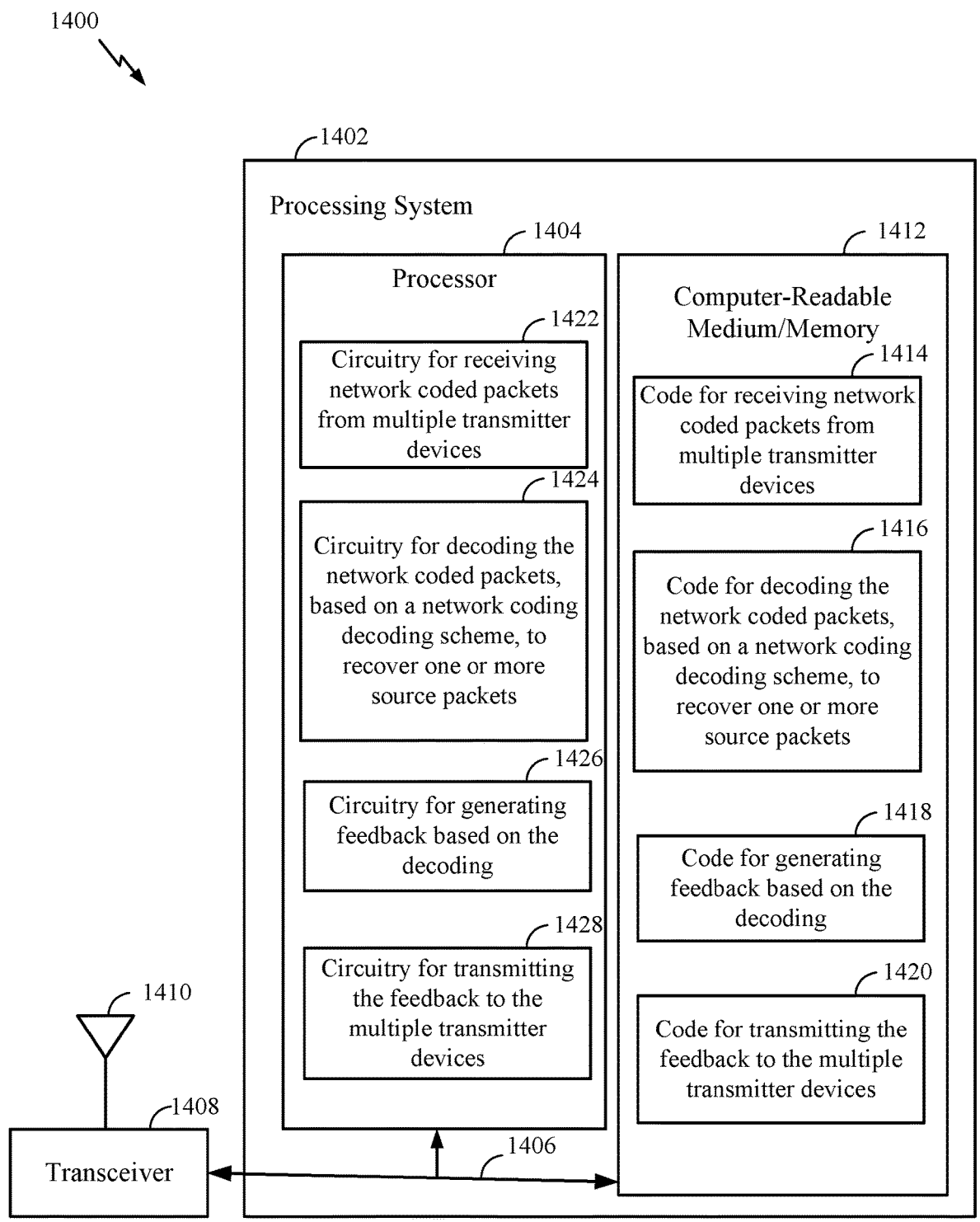

FIG. 14 illustrates a communications device 1400 that may include various components (e.g., corresponding to means-plus-function components) configured to perform operations for the techniques disclosed herein, such as the operations illustrated in FIG. 6. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 6, or other operations for performing the various techniques discussed herein. In certain aspects, computer-readable medium/memory 1412 stores: code 1414 for receiving network coded packets from multiple transmitter devices; code 1416 for decoding the network coded packets, based on a network coding decoding scheme, to recover one or more source packets; code 1418 for generating feedback based on the decoding; and code 1420 for transmitting the feedback to the multiple transmitter devices. In certain aspects, the processor 1404 has circuitry configured to implement the code stored in the computer-readable medium/memory 1412. The processor 1404 includes circuitry 1422 for receiving network coded packets from multiple transmitter devices; circuitry 1424 for decoding the network coded packets, based on a network coding decoding scheme, to recover one or more source packets; circuitry 1426 for generating feedback based on the decoding; and circuitry 1428 for transmitting the feedback to the multiple transmitter devices.

Example Aspects

Aspect 1: A method of wireless communication by a receiver device, comprising receiving network coded packets from multiple transmitter devices; decoding the network coded packets, based on a network coding scheme, to recover one or more source packets; generating feedback based on the decoding; and transmitting the feedback to the multiple transmitter devices.

Aspect 2: The method of Aspect 1, wherein the network coded packets are based on a same set of source packets encoded using the network coding scheme; and transmitting the feedback comprises transmitting the same feedback to each of the multiple transmitter devices indicating which of the same set of source packets were successfully recovered.

Aspect 3: The method of Aspect 2, wherein the feedback is sent via a network coded sublayer decoded packets report.

Aspect 4: The method of Aspect 2 or 3, wherein the feedback is sent via a field in a radio link control (RLC) status report.

Aspect 5: The method of Aspect 4, wherein the RLC status report comprises information associated with the decoded network coded packets.

Aspect 6: The method of any of Aspects 1-5, wherein the network coded packets are based on a different sets of source packets encoded using the network coding scheme; and transmitting the feedback comprises transmitting different feedback to the multiple transmitter devices, each different feedback indicating which source packets of a different set of source packets were successfully recovered.

Aspect 7: The method of Aspect 6, wherein the feedback is sent via a network coded sublayer decoded packets report.

Aspect 8: The method of Aspect 6 or 7, wherein the feedback is sent via a field in a RLC status report.

Aspect 9: The method of Aspect 8, wherein the RLC status report comprises information associated with the decoded network coded packets.

Aspect 10: The method of any of Aspects 6-9, wherein the feedback is sent via a RLC status report with information regarding received network coded packets.

Aspect 11: The method of Aspect 6-10, wherein the feedback comprises hybrid automatic repeat request (HARD) acknowledgment feedback.

Aspect 12: The method of any of Aspects 1-11, wherein the same feedback is sent to each of the multiple transmitter devices.

Aspect 13: The method of any of Aspects 1-12, wherein different feedback is sent to each of the multiple transmitter devices.

Aspect 14: A method of wireless communication by a first transmitter device, comprising generating, from a RLC service data unit (SDU), a first number of source packets; generating, from the first number of source packets, a second number of network coded packets based on a network coding scheme, wherein the second number is greater than the first number; and transmitting the second number of network coded packets to a receiver device via one or multiple diverse paths.

Aspect 15: The method of Aspect 14, wherein the first transmitter device is one of multiple transmitter devices; and the network coded packets are sent as part of a multi-cast transmission in which each of the multiple transmitter devices generates, from the same first number of source packets, the greater second number of network coded packets using the same network coding scheme, and transmits the greater second number of network coded packets to the receiver device.

Aspect 16: The method of Aspect 15, further comprising receiving feedback from the receiver device regarding packets successfully decoded at the receiver device; and updating the network coding scheme based on the feedback.

Aspect 17: The method of Aspect 16, wherein the feedback is received via a network coded sublayer decoded packets report.

Aspect 18: The method of Aspect 16 or 17, wherein the feedback is received via a field in an RLC status report.

Aspect 19: The method of Aspect 18, wherein the RLC status report indicates one or more decoded network coded packets.

Aspect 20: The method of any of Aspects 16-19, wherein updating the network coding scheme comprises updating an encoding distribution function according to the feedback.

Aspect 21: The method of any of Aspects 14-20, wherein the first transmitter device is one of multiple transmitter devices; and the network coded packets are sent as part of a multi-cast transmission in which each of the multiple transmitter devices generates, from different source packets, different network coded packets using the same network coding scheme, and transmits the different network coded packets to the receiver device.

Aspect 22: The method of Aspect 21, further comprising receiving feedback from the receiver device regarding packets successfully decoded at the receiver device; and updating the network coding scheme based on the feedback.

Aspect 23: The method of Aspect 22, wherein the feedback is received via a network coded sublayer decoded packets report.

Aspect 24: The method of Aspect 22 or 23, wherein the feedback is received via a field in an RLC status report.

Aspect 25: The method of Aspect 24, wherein the RLC status report indicates one or more decoded network coded packets.

Aspect 26: The method of any of Aspects 22-25, wherein the feedback is received via a RLC status report with information regarding network coded packets as received at the receiver device.

Aspect 27: The method of any of Aspects 24-26, further comprising buffering network coded packets indicated as successfully received in the RLC status report; decoding the buffered network coded packets to recover one or more of the source packets; and updating an encoding distribution function of the network coding scheme based on a result of the decoding.

Aspect 28: The method of any of Aspects 22-27, wherein the feedback comprises HARQ acknowledgment feedback; and the method further comprising buffering medium access control (MAC) protocol data units (PDUs) indicated as successfully received in the HARQ acknowledgment feedback; extracting network coded packets from the buffered MAC PDUs; decoding the extracted network coded packets to recover one or more of the source packets; and updating an encoding distribution function of the network coding scheme based on a result of the decoding.

Aspect 29: An apparatus for wireless communication by a UE, comprising a memory and at least one processor coupled to the memory, the memory and the at least one processor being configured to perform any of the operations of Aspects 1-28.

Aspect 30: An apparatus for wireless communication by a UE, comprising means for performing any of the operations of Aspects 1-28.

Aspect 31: A computer readable medium having instructions stored thereon for performing any of the operations of Aspects 1-28.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 5 and 6 may be performed by various processors shown in FIG. 2 of the BS 110 and/or UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a receiver device, comprising:
    receiving a plurality of network coded packets from multiple transmitter devices, each of the plurality of network coded packets including data for a common source packet, and wherein receiving the plurality of network coded packets from the multiple transmitter devices comprises:
        receiving a first network coded packet from a first transmitter device of the multiple transmitter devices; and
        receiving a second network coded packet from a second transmitter device of the multiple transmitter devices;
    decoding one or more of the network coded packets, based on a network coding scheme, to recover the common source packet, wherein decoding the one or more of the network coded packets comprises:
        decoding the first network coded packet;
        determining that the second network coded packet cannot be decoded; and
        recovering the common source packet using the first network coded packet;
    generating feedback based on the decoding, the feedback indicating that the common source packet was recovered; and
    transmitting the feedback to one or more of the multiple transmitter devices.

2. The method of claim 1, wherein:
    the plurality of network coded packets form part of multiple pluralities of network coded packets that are based on a same set of source packets encoded using the network coding scheme; and
    transmitting the feedback comprises transmitting the same feedback to each of the multiple transmitter devices indicating which of the common source packets of the same set of source packets were successfully recovered.

3. The method of claim 2, wherein the feedback is transmitted via a network coded sublayer decoded packets report.

4. The method of claim 2, wherein the feedback is transmitted sent via a field in a radio link control (RLC) status report.

5. The method of claim 4, wherein the RLC status report comprises information associated with the decoded network coded packets.

6. The method of claim 1, wherein:
    the plurality of network coded packets form part of multiple pluralities of network coded packets, and two or more of the pluralities of network coded packets are based on different sets of source packets encoded using the network coding scheme; and
    transmitting the feedback comprises transmitting different feedback to the multiple transmitter devices, each different feedback indicating which source packets of the different sets of source packets were successfully recovered.

7. The method of claim 6, wherein the feedback is transmitted via a network coded sublayer decoded packets report.

8. The method of claim 6, wherein the feedback is transmitted via a field in a radio link control (RLC) status report.

9. The method of claim 8, wherein the RLC status report comprises information associated with the decoded network coded packets.

10. The method of claim 6, wherein the feedback is transmitted via a radio link control (RLC) status report with information regarding received network coded packets.

11. The method of claim 6, wherein the feedback comprises hybrid automatic repeat request (HARD) acknowledgment feedback.

12. The method of claim 1, wherein the same feedback is transmitted to each of the multiple transmitter devices.

13. The method of claim 1, wherein different feedback is transmitted to each of the multiple transmitter devices.

14. An apparatus for wireless communication, comprising:
    a receiver configured to receive a plurality of network coded packets from multiple transmitter devices, each of the plurality of network coded packets including data for a common source packet;

a processing system comprising one or more processors, the processing system being configured to:

determine that the plurality of network coded packets includes a first network coded packet from a first transmitter device of the multiple transmitter devices and a second network coded packet from a second transmitter device of the multiple transmitter devices;

decode one or more of the network coded packets, based on a network coding scheme, to recover the common source packet, wherein to decode the one or more of the network coded packets, the at least one processor is configured to:

decode the first network coded packet;
determine that the second network coded packet cannot be decoded; and
recover the common source packet using the first network coded packet; and generate feedback based on the decoding, the feedback indicating that the common source packet was recovered; and a transmitter configured to transmit the feedback to one or more of the multiple transmitter devices.

15. An apparatus for wireless communication comprising:
a memory; and
one or more processors coupled to the memory, wherein the apparatus is configured to:

receive a plurality of network coded packets from multiple transmitter devices, each of the plurality of network coded packets including data for a common source packet, and wherein to receive the plurality of network coded packets from the multiple transmitter devices, the apparatus is configured to:

receive a first network coded packet from a first transmitter device of the multiple transmitter devices; and receive a second network coded packet from a second transmitter device of the multiple transmitter devices;

decode one or more of the network coded packets, based on a network coding scheme, to recover the common source packet, wherein to decode the one or more of the network coded packets, the apparatus is configured to:

decode the first network coded packet;
determine that the second network coded packet cannot be decoded; and
recover the common source packet using the first network coded packet;

generate feedback based on the decoding, the feedback indicating that the common source packet was recovered; and transmit the feedback to one or more of the multiple transmitter devices.

16. The apparatus of claim 15, wherein:
the plurality of network coded packets form part of multiple pluralities of network coded packets that are based on a same set of source packets encoded using the network coding scheme; and
to transmit the feedback, the apparatus is configured to transmit the same feedback to each of the multiple transmitter devices indicating which of the common source packets of the same set of source packets were successfully recovered.

17. The apparatus of claim 16, wherein, to transmit the feedback, the apparatus is configured to transmit the feedback via a network coded sublayer decoded packets report.

18. The apparatus of claim 16, wherein, to transmit the feedback, the apparatus is configured to transmit the feedback via a field in a radio link control (RLC) status report.

19. The apparatus of claim 18, wherein the RLC status report comprises information associated with the decoded network coded packets.

20. The apparatus of claim 15, wherein:
the plurality of network coded packets form part of multiple pluralities of network coded packets, and two or more of the pluralities of network coded packets are based on different sets of source packets encoded using the network coding scheme; and
to transmit the feedback, the apparatus is configured to transmit different feedback to the multiple transmitter devices, each different feedback indicating which source packets of the different sets of source packets were successfully recovered.

21. The apparatus of claim 20, wherein, to transmit the feedback, the apparatus is configured to transmit the feedback via a network coded sublayer decoded packets report.

22. The apparatus of claim 20, wherein, to transmit the feedback, the apparatus is configured to transmit the feedback via a field in a radio link control (RLC) status report.

23. The apparatus of claim 22, wherein the RLC status report comprises information associated with the decoded network coded packets.

24. The apparatus of claim 20, wherein, to transmit the feedback, the apparatus is configured to transmit the feedback via a radio link control (RLC) status report with information regarding received network coded packets.

25. The apparatus of claim 20, wherein the feedback comprises hybrid automatic repeat request (HARQ) acknowledgment feedback.

26. The apparatus of claim 15, wherein, to transmit the feedback, the apparatus is configured to transmit the feedback to each of the multiple transmitter devices.

27. The apparatus of claim 15, wherein, to transmit the feedback, the apparatus is configured to transmit the feedback to each of the multiple transmitter devices.

* * * * *